March 25, 1952  M. E. WILKE  2,590,284
ELECTRIC TERMINAL FOR DRY BATTERIES
Original Filed Feb. 5, 1948  2 SHEETS—SHEET 1
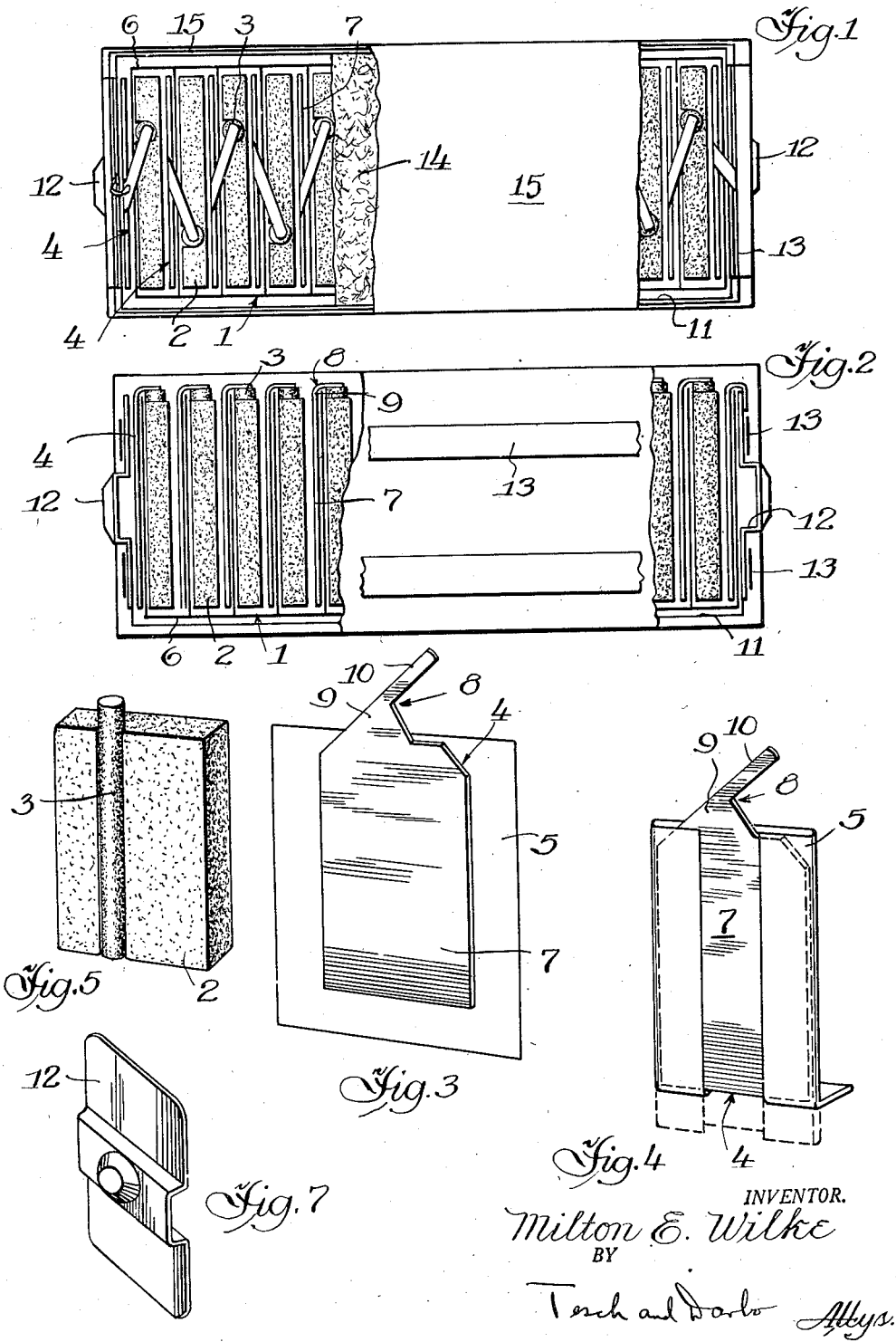
INVENTOR.
Milton E. Wilke INVENTOR.
Milton E. Wilke
BY
Tesch and Darbo Attys.

Patented Mar. 25, 1952

2,590,284

UNITED STATES PATENT OFFICE 2,590,284

ELECTRIC TERMINAL FOR DRY BATTERIES

Milton E. Wilke, Freeport, Ill., assignor, by mesne assignments, to Burgess Battery Company, Freeport, Ill., a corporation of Delaware Original application February 5, 1948, Serial No. 6,425. Divided and this application May 17, 1948, Serial No. 27,508

4 Claims. (Cl. 136—135)

This invention relates to electric terminals and more especially an electrode terminal for a dry cell for connecting in series a plurality of such cells to form a battery. This application is a division of the co-pending application of Milton E. Wilke, Serial No. 6,425, filed February 5, 1948.

The principal object of the invention is to provide a metallic plate which forms an electrode of the cell and which includes as an integral part thereof an intercell communicating element adapted to connect terminal points of adjacent cells which are spaced sidewise as well as in the direction of the stacking of the cells of the battery. An advantage of this construction is to be found in the increased spacing between terminal elements of adjacent cells which permit improved sealing of the cells.

Since the terminal enjoys its principal utility as an element of a dry cell, it is so described herein in the manner in which it is used in the construction of dry cells and batteries.

In the accompanying drawings:

Fig. 1 is a diagrammatic top view of a battery embodying the invention;

Fig. 2 is a diagrammatic side elevational view of the battery of Fig. 1;

Fig. 3 is a perspective view of one form of negative electrode terminal plate with a separator element prior to application of the latter;

Fig. 4 is a perspective view of the negative electrode terminal plate and separator assembly;

Fig. 5 is a perspective view of a mix block and carbon rod positive electrode terminal assembly;

Fig. 7 is a perspective view of a terminal plate for the battery of Fig. 1;

Figure 6:
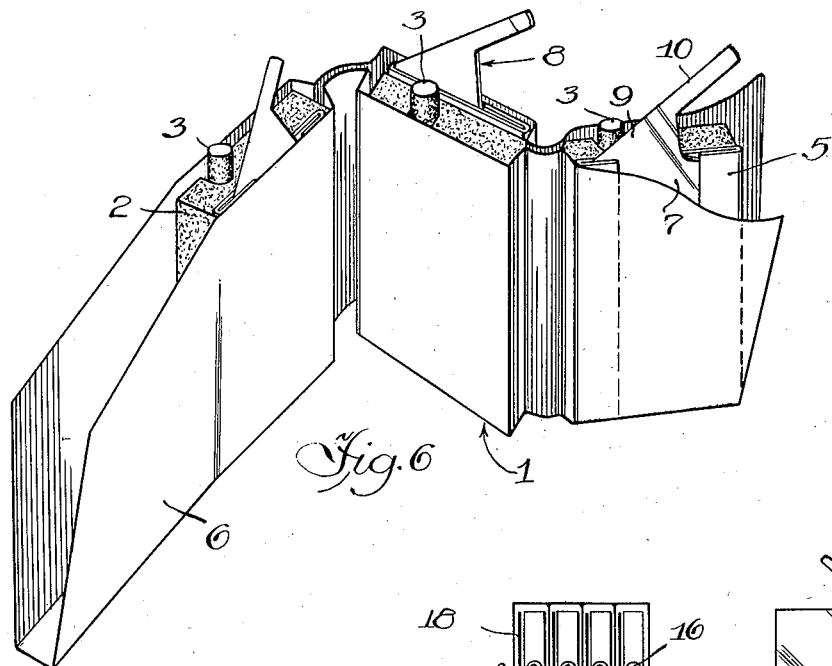
Fig. 6 is a perspective view of a group of cells in process of manufacture.
Figure 12:
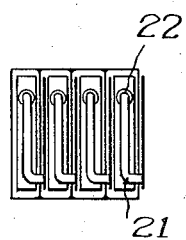

Figs. 8, 10, 12, and 14 are diagrammatic top views of alternative battery structures embodying the invention; and Figs. 9, 11, 13, and 15 are front views of the negative electric terminal plates employed in the batteries of Figs. 8, 10, 12, and 14, respectively.

The development in recent years of portable battery-powered equipment, such as portable radio receivers and hearing aid devices, has given impetus to the improvement of the output capacity per unit of battery volume and to the general scaling down of all battery dimensions to reduce the weight and space requirements. This has encouraged the use of flat cells rather than the space extravagant round cells more generally used in earlier "B" batteries. Where the several cells of the battery are electrically connected by means of terminals exposed on one side thereof, the crowding of the cell terminals as the cells are miniaturized renders more difficult the soldering and other intercell connecting operations and gives rise to new problems in properly sealing the cells and battery. The present invention is directed to the alleviation of these particular problems.

In carrying out the invention, the metallic electrode of the cell is so formed and the cells and terminals thereof are so arranged in the battery block that the intercell connectors extend sidewise as well as lengthwise between the terminals to be connected. In this arrangement, the cell terminals and intercell connectors are spaced further apart to permit more room for the operator to work in connecting the cells and avoid narrow interspaces into which the sealing material will not flow.

The invention is exemplified in a battery diagrammatically illustrated in Figs. 1 and 2 and composed of a series of juxtaposed flat cells 1 of the Leclanche type. The principal elements of these cells are mix blocks or cakes 2, shown separately in Fig. 5, carbon rod electrode terminals 3 embedded in mix cakes 2 and projecting above the top side of the mix cake, zinc negative electrode terminal plates 4, illustrated separately in Fig. 3 and each having a covering on its inner face of paper or other bibulous material 5, as illustrated in Fig. 4, and envelopes 6 of a suitable film material resistant to battery liquids, such as a rubber hydrochloride composition sold under the name "Pliofilm." The composition and general specifications of these several cell elements are well known and understood and will not be described in detail herein except to the extent necessary to a thorough understanding of the invention.

With the exception of the metallic electrode terminal plate 4, all cell and battery elements employed in the battery of Figs. 1 and 2 are standard parts. Plate 4 is composed of two parts; namely, a rectangular body portion 7 which serves as the active negative electrode of the cell and a terminal lug 8 integral with the body plate 7 and projecting from the top side, as illustrated. The terminal portion 8 of plate 4 may also be considered to have two parts; namely, a relatively inflexible broad base portion 9 and a narrower flexible extremity 10 extending outwardly from plate 4 and terminal base 9. The functions of these two parts of terminal lug 8 will be described presently.

In manufacturing the cells for the battery, the paper separators 5 are applied to electrode terminal plates 4 by folding the side marginal portions around the side edges of the plate and then folding the bottom portion of the paper (shown in dotted lines in Fig. 4) under along the bottom edge of plate 4. Although it is strictly necessary only to cover the inner face of portion 7 of plate 4 to separate the same from mix cake 2 in the cell, it is desirable to cover the edges of the plate and extend the lower portion of the separator, as shown, to prevent short circuiting of the cell by contact of the mix with the electrode. The mix cake 2, generally formed by extruding and cutting to size, may then be laid in position upon paper separator 5. Carbon rod electrode terminal 3 is laid upon the face of the mix cake opposite from the negative terminal plate and pressed into the cake. The carbon terminal may be placed in the cake prior to bringing the latter together with the negative electrode assembly, if desired. Carbon terminal 3 may be triangular in cross section, if desired, to lay flat and flush with the surface of the mix cake.

Each individual cell so assembled is then wrapped in an envelope 6 which is entirely closed except at the top of the cell. The cells may be individually wrapped or they may be individually sealed in a continuous band of the film material, as illustrated in Fig. 6. This convenient method of packaging the individual cells is known and in regular commercial use and is therefore not described in further detail herein.

It will be noted that lug 8 is not located at the middle of the top side of plate 4, but rises from one side of the top of this plate. This leaves an open area above the top of the electrode portion 7 at the opposite end of the top of plate 4. The significance of this open area will be apparent as the sealing operation is described. In applying the separators 5 to the plates 4, the faces of a given side of half of the plates are covered to form right hand electrode terminal assemblies and the faces of the opposite side of the remaining plates are covered to form left hand electrode terminal assemblies.

In assembling the cells, the carbon electrode 3 is also disposed on one side of the middle of mix cake 2. As shown in Fig. 6, the positive and negative terminals of each cell are located on the same side of the cell and at the opposed faces thereof. The zinc plate 4 forms one face of the cell and the carbon electrode is embedded in mix cake 2 at the opposite face or surface of the cell.

In grouping the cells to form the battery, they are so arranged that the terminals of alternate cells of the series are disposed on one side of the middle of the cells and the terminals of the remaining alternate cells are disposed on the other side of the middle thereof. In other words, the cells are arranged in a juxtaposed series with alternating right and left hand terminal assemblies resulting in a zig-zag disposition of the series of terminals (see Fig. 1). The terminals of adjoining cells to be electrically connected are spaced laterally as well as longitudinally in the battery block. The desired number of cells are placed in an inner battery box 11 of cardboard impregnated with wax or resin. The flexible extremities 10 of terminal lugs 8 are then bent outwardly from the cell of which it is a part to extend crosswise or sidewise as well as lengthwise of the battery to engage the positive terminal of the adjoining cell. The length and direction of projection of the flexible extremity 10 from lug base 9 or plate 4 before bending is such that the end of the flexible strip rests upon the positive terminal of the adjoining cell when the strip is bent as described.

The less flexible base portions 9 of the lugs serve to space the intercell connector strips above the tops of the cells at approximately the height of the carbon terminals. The intercell connections may be completed by soldering the strips 10 to the connecting terminal or by otherwise permanently completing the electrical connection. The appearance of the top of the battery block, so connected, is shown in Fig. 1.

Suitable battery terminals, such as brass plates 12, may then be electrically connected by suitable means with the end terminals of the cell block, the entire assembly bound together by straps 13, and a seal 14 applied to the top of the cell block by pouring a thermoplastic sealing material in molten form upon the tops of the cells. The battery unit may then be inserted in a suitable outer carton 15.

It will be appreciated that this arrangement of cell terminals avoids narrow interspaces at the tops of the cells which might cause imperfect sealing. The terminals of each cell are spaced by a substantial thickness of mix as well as by separator 5. The positive terminals are not opposite the negative terminals of adjoining cells, but project from the tops of the cells opposite the cut-out areas of the negative electrode terminals of the adjoining cells. Thus, clear spaces are provided around both positive and negative terminals for the sealing material.

Many alternative forms of structure may be employed in carrying out the principle of this invention. For example, it is not necessary to arrange the terminals so that the intercell connectors are criss-crossed (see Fig. 1), nor is it necessary to locate the carbon terminals on one side of the cells. In the battery illustrated in Fig. 8, carbon terminals 16 are disposed midway between the two sides of the cells and intercell connector strips 17 extend from one side of the tops of negative electrode terminal plates 18 and cross over to the positive terminals in connecting the cells together. The shape of a suitable negative electrode terminal plate for this battery is illustrated in Fig. 9. All of the cells of this battery are identical.

Figure 8:
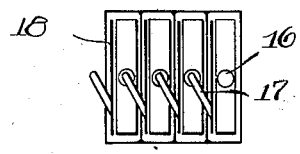
Figure 9:
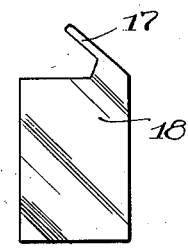
Figure 10:
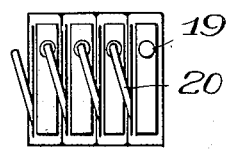
Figure 11:
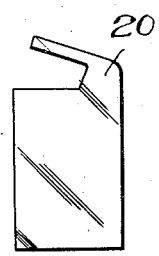
Figure 14:
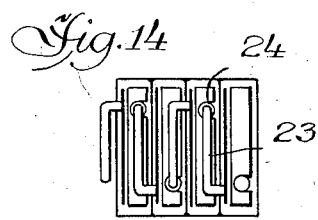

The battery illustrated in Fig. 10 is similar to that shown in Fig. 8, except that positive terminals 19 are located on one side of the middle of the cells and negative terminals 20 are disposed on the opposite side. The choice between the structures of Figs. 8 and 10 depends upon the widths of the cells used and possibly other considerations. The shape of the negative electrode plate for the battery of Fig. 10 is illustrated in Fig. 11.

Figure 13:
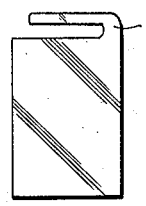
Figure 15:

Although in all embodiments of the invention, the intercell connectors extend sidewise or crosswise of the battery, as well as a sufficient distance lengthwise to reach the terminals of adjoining cells, the structure is not limited to one in which the connectors reach diagonally in approximately straight lines between the connected terminals. In the batteries illustrated in Figs. 12 and 14, intercell connectors 21 and 23 extend crosswise from positive cell terminals 22 and 24, respectively, to points approximately opposite the negative terminals respectively connected therewith and then to the negative terminals in a direction lengthwise of the battery. Suitable electrode terminal plates are shown in Figs. 13 and 15.

The invention is applicable to all batteries in which the terminals of adjoining cells are only narrowly separated, such as in batteries having cells comprising two sheet form or metallic foil electrode terminals.

Invention is claimed as follows:

1. An electrode terminal for a dry cell comprising a metallic plate having a lug integral therewith and projecting from one edge at one side of the middle thereof, said lug comprising a relatively broad base portion and a narrower elongated extremity extending sidewise as well as outwardly from said base portion in the plane of said plate, the width of said extremity being least at the juncture thereof with said base portion, said lug being flexible at said juncture.

2. An electrode terminal for a dry cell comprising a metallic plate having a lug integral therewith and projecting from one edge at one side of the middle thereof, said lug comprising a relatively broad base portion and a narrower elongated extremity extending in a direction substantially parallel to said side in the plane of said plate, the width of said extremity being least at the juncture thereof with said base portion, said lug being flexible at said juncture.

3. An electrode terminal for a dry cell comprising a metallic plate having a lug integral therewith and projecting from one edge at one side of the middle thereof, said lug comprising a relatively broad base portion and a narrower elongated extremity, the width of said extremity being least at the juncture thereof with said base portion, said lug being flexible at said juncture.

4. An electrode terminal in accordance with claim 3 in which said extremity extends diagonally outwardly from said base portion of said lug.

MILTON E. WILKE.

REFERENCES CITED

The following references are of record in the file of this patent:

UNITED STATES PATENTS

| Number | Name | Date |
| --- | --- | --- |
| 615,292 | Maas | Dec. 6, 1898 |
| 772,415 | Jackson | Oct. 18, 1904 |
| 1,309,561 | Beaumont | July 8, 1919 |
| 2,480,531 | Wilke | Aug. 30, 1949 |

FOREIGN PATENTS

| Number | Country | Date |
| --- | --- | --- |
| 149,351 | Great Britain | Oct. 24, 1921 |
| 160,828 | Great Britain | June 30, 1922 |
| 360,769 | Germany | Oct. 6, 1922 |
| 634,574 | France | Nov. 28, 1927 |